Dec. 22, 1959  R. A. WITTREN  2,917,941
SELECTOR MEANS

Filed March 13, 1958  2 Sheets-Sheet 1

INVENTOR.
R. A. WITTREN

Dec. 22, 1959   R. A. WITTREN   2,917,941
SELECTOR MEANS
Filed March 13, 1958   2 Sheets-Sheet 2

INVENTOR.
R. A. WITTREN

United States Patent Office 2,917,941
Patented Dec. 22, 1959

2,917,941

SELECTOR MEANS

Richard A. Wittren, Waterloo, Iowa, assignor, by mesne assignments, to Deere & Company, a corporation of Delaware Application March 13, 1958, Serial No. 721,266

15 Claims. (Cl. 74—473)

This invention relates to selector means and more particularly to such means as adapted for effecting the selection of speed and range ratios in a vehicle transmission.

The selector means finds particular utility in a transmission shifting environment in which a single selector lever or equivalent member is movable through a shift pattern having a plurality of parallel slots and an intersecting cross-over slot, such as is employed in a transmission of the dual-range multi-ratio type, one example of which forms the subject matter of the U.S. patent to DuShane 2,710,546. In a transmission of that type, a plurality of reverse speeds are available, in addition to several forward speeds, and it is a significant object of the present invention to afford selector means in which the operator is afforded a requisite amount of "feel" so that he can ascertain when he is moving into and out of the reverse phase of the shift pattern. It is a further object of the invention generally to simplify the selector means as to mounting and construction.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Figure 1:
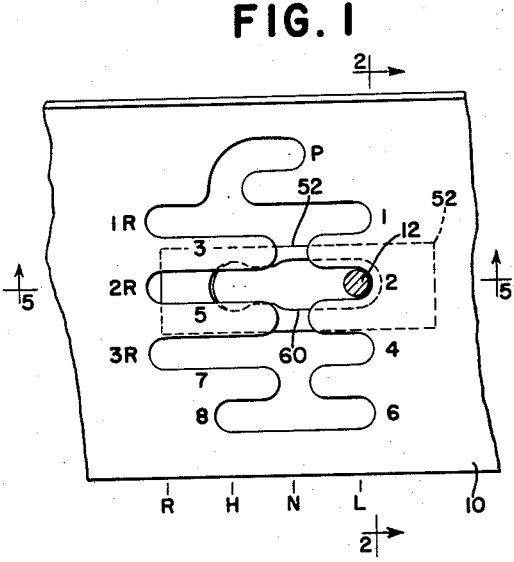
Fig. 1 is a plan, partly in section, of the panel embodying the slots making up the shift pattern.
Figure 2:
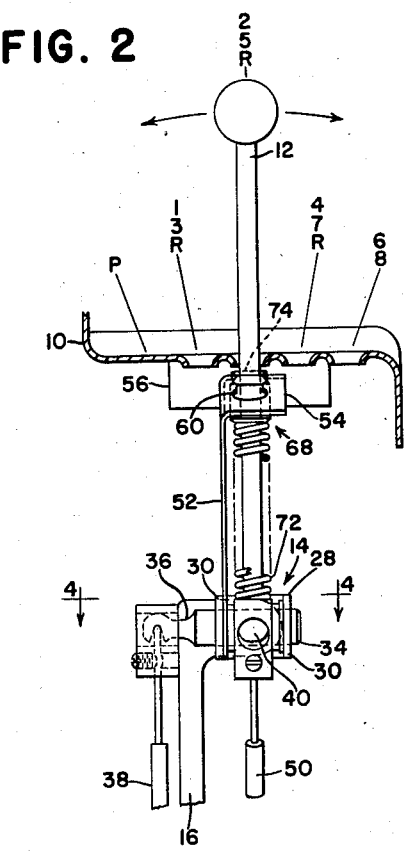
Fig. 2 is a section generally on the line 2—2 of Fig. 1.

Although a transmission as such is not illustrated in connection with the selector means, it will be understood that any type of transmission may be operated thereby. The DuShane patent mentioned above is a good example of a multi-speed dual-range transmission. Likewise, the connections between the selector means and the transmission may be simple mechanical connections or may include adequate power actuators, such as hydraulic cylinders, for example. These are considered as fairly obvious expedients and therefore are suggested rather than illustrated.

As a further means of clarifying the disclosure, reference is had to the parts as occupying certain positions and as being movable fore-and-aft and laterally. However, it should be understood that these are terms of convenience and not of limitation.

The general structure involves a panel or equivalent member, identified at 10 and having a shift pattern afforded by a plurality of fore-and-aft slots intersected by a transverse cross-over slot. The ends of the fore-and-aft slots are identified by appropriate numerals or combinations of numerals and letters indicating the speeds that will be produced in the transmission according to the position of a selector lever 12. As will be seen, there are four fore-and-aft slots identified as 1–1R, 2–2R, 4–3R and 6–8. The 6–8 slot is somewhat shorter than the others, but could be extended to include a 4R position for a fourth speed in reverse if desired. In the particular transmission to which reference has already been had, the fourth speed in reverse is deemed too high for safe operation in an agricultural tractor, for example. This again is a detail that imports no limitations into the present invention. Three additional speed positions for the selector lever 12 are obtainable, one each in each of the 1–1R slot, the 2–2R slot and the 4–3R slot; namely, 3, 5 and 7.

It will be noted that the 1, 2, 4 and 6 positions are in transverse alignment in what may be referred to as the low or "L" end of the range of fore-and-aft movement of the selector lever 12. The 1R, 2R and 3R positions in the respective slots are at the opposite or reverse or "R" ends of the slots. The 3, 5, 7 and 8 positions are in an intermediate part of the fore-and-aft range. The cross-over slot lies midway between the 1, 2, 4 and 6 ends of the slots and the 3, 5, 7 and 8 positions in the slots, and is therefore in a neutral phase of the shift pattern. The cross-over slot will not be otherwise identified except by its position in said "N" part of the pattern.

The shift pattern includes an extra position, here identified by the letter P and representing a position of the selector lever 12 in which the transmission is in a "park" status.

In further explanation of the shift pattern, and having particular reference to the above identified DuShane patent, it should be noted that the transmission provides four speeds forward in a low range (namely, first, second, fourth and sixth) and four speeds forward in a reverse range (namely, third, fifth, seventh and eighth). In addition, the range section of that transmission enables the production of four speeds in reverse, only three of which are used (namely, 1R, 2R and 3R). From the foregoing, it will be seen that the selector lever 12 may be moved selectively among the several slots, moving either fore-and-aft or laterally, as the case may be. It will be understood that when the selector lever is moved laterally, it is moving in the neutral part of the pattern, and when aligned with the selected fore-and-aft slot must be moved in one direction or the other therein to engage the transmission. For example, the selector lever 12 is shown at the forward end of the 2–2R slot and therefore the transmission is in second speed. As respects its position in lateral alignment with the front ends of the other slots, it is in the low part of the shift pattern.

Figure 4:
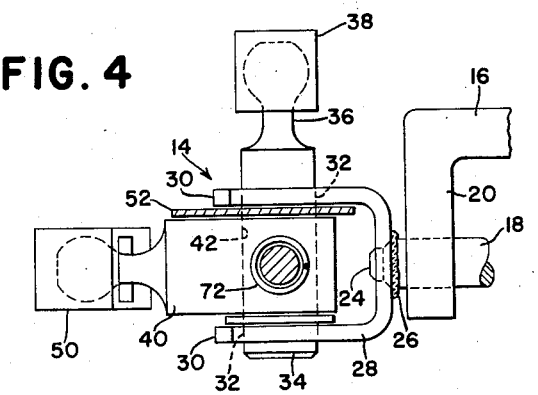
Fig. 4 is an enlarged fragmentary view, partly in section, as seen along the line 4—4 of Fig. 2.

Mounting of the selector lever 12 at its lower end so that it may partake of the movement already described is accomplished by joint means 14 having connection to a support 16 associated with the panel 10. This joint means include a fore-and-aft shaft 18 journaled at 20 in the support 16 and retained at 22 against axial shifting relative to the support. The shaft 18 projects from the support to a free terminal end 24 (Fig. 4) and is thereat rigidly secured, as by welding at 26, to a yoke 28 which has laterally spaced apart legs 30 parallel to the axis of the shaft 18. In other words, the yoke forms in substance an extension of the shaft 18. The legs 30 respectively have apertures 32 coaxial on a transverse axis which is of course normal to the axis of the shaft 18. These apertures journal therein a pintle 34 which has a coaxial extension 36 serving as a first lever arm for effecting an operative connection either directly to the transmission or to an intermediary power actuator. The connection shown here is in the form of a sheathed cable 38 of typical construction.

A second lever arm member 40 is apertured at 42 to receive the pintle 34 intermediate the yoke legs 30. The second lever arm is apertured at 44 in register with a vertical aperture 46 in the pintle 34, and means effecting a connection between the pintle and the lever arm 40 comprises a lower threaded end on the selector lever 12, which passes through the registered apertures and receives a lock nut 48. The lever arm 40 extends rearwardly and has an operative connection to a sheathed cable at 50, this cable leading to the transmission or to intermediary power means.

From the description thus far, it will be seen that the selector lever 12 is, at its lower end, a unitary part of the pintle 34 and lever arm 40, and is therefore rockable in the cross-over slot about the axis of the shaft 18 and is rockable fore-and-aft in any of the other slots about the transverse axis of the pintle 34. When applied to a transmission of the character referred to, lateral shifting of the selector lever 12 in the cross-over slot effects, by means of the sheathed cable 38, a pre-selection of either of two forward speeds, the ultimate selection as between the higher or lower of which is achieved by shifting the selector 12 thence either forwardly or rearwardly. For example, should it be desired to obtain seventh speed forward in the transmission, the selector lever 12 will first be moved rearwardly from its Fig. 1 position so that it registers with the cross-over slot, at which time it is in the neutral part of the shift pattern. The lever is then shifted laterally to the 4-7-3R slot and is then shifted rearwardly into transverse alignment with the numeral 7 on the panel. As the lever 12 is rocked rearwardly to the cross-over slot, it shifts the range section of the transmission into neutral; then, as it is moved to the 4-7-3R slot, it engages gearing or the like capable of producing either fourth speed forward or seventh speed forward (or third speed in reverse), but the range section is still in neutral. Then, when the selector lever is moved back to the 7 position, it establishes the gearing or the like in the high part of the range section. If the lever were moved forwardly to the 4 position, it would establish the low part of the range section. The foregoing is of course merely illustrative of one particular environment in which the selector means finds utility.

As already described, the joint means 14 affords a simple and compact means for mounting the lever 12 for the necessary movement through the shift pattern defined in the panel 10. It is another feature of the invention to improve the nature of the selector lever movement, particularly in the forward range. For this purpose, the selector means includes a plate or member 52 journaled coaxially with the shift lever via the pintle 34. The plate 52 extends radially toward but terminates below the panel 10 in a terminal arcuate flange 54. The arcuate extent of the flange 54 is less than the angular distance between front and rear stops 56 and 58 which are fixed relative to the support and panel 10, preferably being secured to and depending from the panel.

Figure 3:
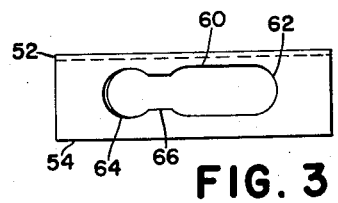
Fig. 3 is a plan view of the "feel" member per se.

The flange 54 has therein an elongated slot 60 through which the selector lever 12 loosely passes. The configuration of this slot is best shown in Fig. 3, wherein it will be seen that it has opposite front and rear relatively wide end portions 62 and 64, respectively, and an intermediate relatively narrow neck portion 66. The arcuate length of the slot 60 is less than that of any one of the longer slots, as 1-1R.

The plate 52 and selector lever 12 are interconnected by detent means 68, here comprising a detent element 70 axially slidable on the selector lever 12 and spring loaded upwardly by a coil spring 72 acting between the element 70 and the rearward or second lever arm 40. A cross pin 74 through the selector lever 12 above the detent element 70 limits upward movement of the detent element. The shape of the detent element and its relation to the slot 60 in the flange 54 of the plate is such that the element engages the flange in the slot 60 either ahead of or to the rear of the narrow neck portion 66 of the slot and, subject to the lost motion connection afforded because the front portion 62 of the slot is materially longer than the rear portion 64, the detent means thus afforded interconnects the lever 12 and plate 52 for movement in unison about the transverse axis established by the pintle 34. Since the plate 52 is mounted on the pintle 34 along with the lever 12, it follows that the two may rock in unison about the fore-and-aft axis established by the mounting shaft 18.

The operation of the selector means, to the extent that the detent means is involved, is as follows, noting particularly the "feel" provided by the plate and detent means.

Figure 5:
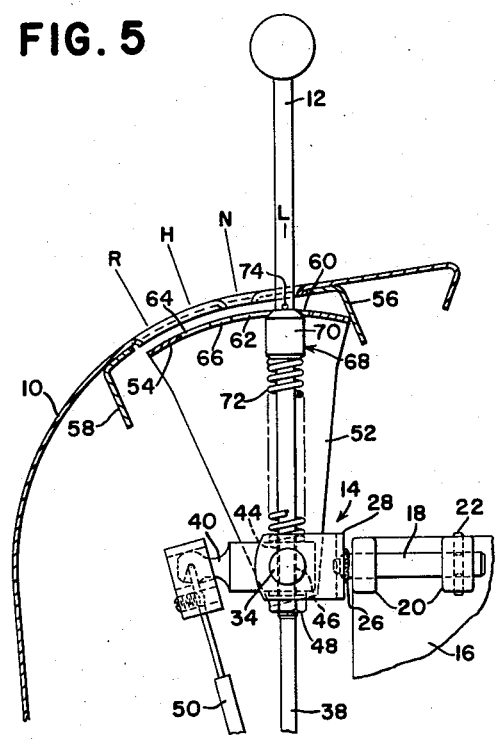
Fig. 5 is a section as seen along the line 5—5 of Fig. 1.
Figure 6:
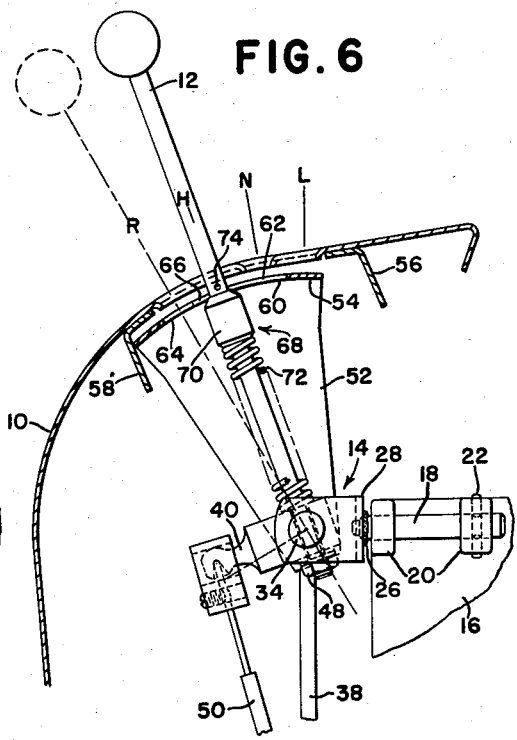
Fig. 6 is a similar section, showing in full lines the position of the selector lever as it approaches the reverse phase, and showing in broken lines the position of the selector lever in the reverse phase.

As shown in Fig. 5, with the selector lever 12 in the 2 position at the front end of the 2-5-2R slot, the front edge of the plate 52 is stopped by or engaged with the front stop 56, and the detent element 70 is riding in the longer wide front part 62 of the flange slot 60. As the lever 12 is rocked rearwardly to the full line position shown in Fig. 6, the detent element 70 ultimately contacts the neck portion 66 of the flange slot, thereby affording a connection between the lever and the plate 52 whereby the latter is moved rearwardly with the lever until it engages or is stopped by the rear stop 58. At this point, the selector lever 12 is still in the "forward" part of the shift pattern and could therefore be in any one of the positions marked 3, 5, 7 or 8. Ignoring the "8" position and assuming that the lever 12 is in one of the other three fore-and-aft slots, it will be noted that further movement into the reverse part of the pattern may be had by the production of additional manual force sufficient to overcome the detent action. That is to say, when the operator forces the lever 12 rearwardly to, say the 2R position, the detent element 70 will yield and thus will pass the narrow neck portion 66 of the flange slot and will reengage behind the neck portion by being received in the rear wide portion 64, as indicated by the broken line in Fig. 6. The force necessary to overcome the detent action affords to the operator the requisite "feel" which informs him that he is proceeding into the reverse part of the shift pattern.

Figure 7:
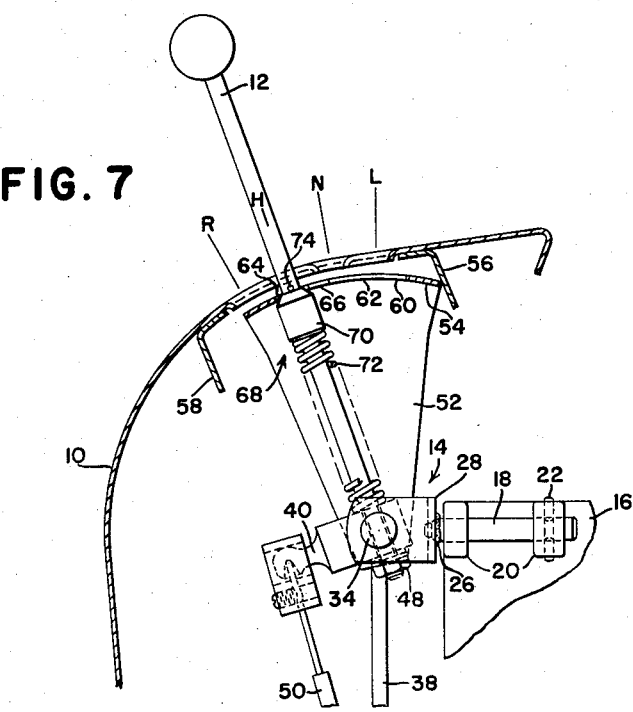
Fig. 7 is a similar section showing the position of the selector lever as it is ready to move out of the reverse phase.

Fig. 7 shows what happens when the lever 12 is moved forwardly from the reverse part of the pattern to the forward part. At this time, the detent element 70 is received in the rear wider portion 64 of the slot 60 and therefore is behind the neck portion 66 of the slot. The lever and plate will thus move in unison to the Fig. 7 position, at which time the front of the plate 52 will engage the forward stop 56. Thus, the lever 12 may be moved from a reverse position to the "high" position immediately ahead of it and vice versa without requiring that the detent 68 be overcome. However, when it is desired to pass into the zone ahead of the Fig. 7 position, additional manual force will overcome the detent action so that the detent element passes the neck portion 66 of the slot to enter again into the elongated front portion 62 of the slot. Thus, additional "feel" is afforded to the operator in this phase of the shift pattern. In short the detent may be said to divide the quadrant or panel into a high-reverse zone and a high-neutral, low zone to which the high positions (Figs. 6 and 7) are common.

When the selector lever is operating in the 6—8 slot, the requirement for "feel" is absent, since the 6—8 slot is shortened to the extent that it does not extend as far rearwardly as the three other slots. Likewise, the "feel" is not present when the selector lever 12 is maneuvered into the park position, except to the extent that when it becomes aligned with the 3 position the operator will realize that it can be shifted laterally and then forwardly to the park position.

Features and advantages of the invention, in addition to those enumerated herein, as well as modifications in the preferred embodiment disclosed, will suggest themselves to those versed in the art, and all of these may be exploited without departure from the spirit and scope of the invention.

What is claimed is:

1. Selector means, comprising: a support; a shaft rockable about its axis in the support and projecting to a free terminal end; a yoke rigid on said end as an extension of the shaft and having a pair of legs parallel to the shaft axis, said legs respectively having apertures therein alined on an axis transverse to the shaft axis; a pintle passed through the leg apertures and journaled thereby for rocking about the aperture axis and carried by the yoke for turning with the yoke and shaft about the shaft axis, said pintle having an extension at one end thereof and to one side of the yoke affording a first lever arm having the shaft axis as its fulcrum and said pintle having intermediate the legs an aperture transverse to the axes of both the shaft and the leg apertures; a second lever arm having one end provided with an aperture in register with the pintle aperture and projecting generally normal to the pintle and remotely from the shaft to a free second end; and an operating member having a portion passed through the registered pintle and second lever arm apertures and rigidly interconnecting the pintle and second lever arm and operative to rock the second lever arm about the axis of the yoke leg apertures and to rock the first lever arm, yoke and shaft about the shaft axis.

2. Selector means, comprising: a support; a shaft rockable about its axis in the support and projecting to a free terminal end; a yoke rigid on said end as an extension of the shaft and having a pair of legs parallel to the shaft axis, said legs respectively having apertures therein alined on an axis transverse to the shaft axis; a pintle passed through the leg apertures and journaled thereby for rocking about the aperture axis and carried by the yoke for turning with the yoke and shaft about the shaft axis, said pintle having an extension at one end thereof and to one side of the yoke affording a first lever arm having the shaft axis as its fulcrum; a second lever arm having one end proximate to that portion of the pintle between the yoke legs and projecting generally normal to the pintle and remotely from the shaft to a free second end; and an operating member rigidly interconnecting the pintle and second lever arm and operative to rock the second lever arm about the axis of the yoke leg apertures and to rock the first lever arm, yoke and shaft about the shaft axis.

3. Selector means, comprising: a panel provided with a fore-and-aft slot having front and rear ends; a support below the panel; a selector lever extending upwardly from the support and through said slot and carried by the support for rocking fore-and-aft between said front and rear ends of said slot; a member journaled on the support coaxially with the lever and having a terminal arcuate flange below the panel, said flange having a fore-and-aft slot therein shorter than the panel slot and loosely receiving the lever, said flange slot having such formation as to afford relatively wide front and rear end portions separated by an intermediate relatively narrow neck portion; front and rear stops fixed relative to the panel and support and engageable selectively by the member to limit fore-and-aft rocking of the member to an angular range less than that defined by the front and rear ends of the panel slot; and a yieldable detent element on the lever and normally received by one or the other of the wider end portions to connect the lever and member for rocking in unison within the limits afforded by the front and rear stops, said detent element yielding to pass the neck portion of the flange slot to enable the lever to overrun the stopped member.

4. The invention defined in claim 3, in which: one of the wider portions of the flange slot is elongated to enable limited fore-and-aft movement of the lever relative to the member irrespective of yielding of the detent element.

5. The invention defined in claim 3, in which: the panel has a cross slot intersecting the fore-and-aft slot; and the lever and member are carried by the support for shifting laterally in unison to enable the lever to move in the cross slot while retaining its relation to said member.

6. Selector means, comprising: a panel provided with a fore-and-aft slot having front and rear ends; a support below the panel; a selector lever extending upwardly from the support and through said slot and carried by the support for movement fore-and-aft between said front and rear ends of said slot; a member carried on the support for movement relative to the lever and having a terminal flange below the panel, said flange having a fore-and-aft slot therein shorter than the panel slot and loosely receiving the lever, said flange slot having such formation as to afford relatively wide front and rear end portions separated by an intermediate relatively narrow neck portion; front and rear stops fixed relative to the panel and support and engageable selectively by the member to limit fore-and-aft movement of the member to a range less than that defined by the front and rear ends of the panel slot; and a yieldable detent element on the lever and normally received by one or the other of the wider end portions to connect the lever and member for movement in unison within the limits afforded by the front and rear stops, said detent element yielding to pass the neck portion of the flange slot to enable the lever to overrun the stopped member.

7. The invention defined in claim 6, in which: one of the wider portions of the flange slot is elongated to enable limited fore-and-aft movement of the lever relative to the member irrespective of yielding of the detent element.

8. The invention defined in claim 6, in which: the panel has a cross slot intersecting the fore-and-after slot; and the lever and member are carried by the support for shifting laterally in unison to enable the lever to move in the cross slot while retaining its relation to said member.

9. Selector means, comprising: a panel provided with a fore-and-aft slot having front and rear ends; a support below the panel; a selector lever extending upwardly from the support and through said slot and carried by the support for movement fore and aft between said front and rear ends of said slot; a member carried on the support for movement relative to the lever; front and rear stops fixed relative to the panel and support and engageable selectively by the member to limit fore-and-aft movement of the member to a range less than that defined by the front and rear ends of the panel slot; and yieldable detent means between the lever and member to connect the lever and member for movement in unison within the limits afforded by the front and rear stops, said detent means yielding when the member engages either stop to enable the lever to overrun the stopped member.

10. The invention defined in claim 9, in which: the panel has a cross slot intersecting the fore-and-aft slot; and the lever and member are carried by the support for shifting laterally in unison to enable the lever to move in the cross slot while retaining its relation to said member.

11. Selector means, comprising: a panel having a plurality of fore-and-aft slots respectively having front and rear ends and a cross slot intersecting the fore-and-aft slots intermediate said ends; a support below the panel;

a selector lever extending through the panel for movement fore-and-aft selectively in the fore-and-aft slots and for cross-over movement in the cross slot; joint means connecting the lever to the support on a transverse axis for the aforesaid fore-and-aft movement and on a fore-and-aft axis for said cross-over movement, said joint means including a shaft on said fore-and-aft axis; a yoke rigid with the shaft and having ears apertured on the transverse axis; and a pintle journaled in said apertured ears and rigidly receiving the lever.

12. The invention defined in claim 11, including: a first extension on the pintle affording a first lever arm having the fore-and-aft axis as its fulcrum, and a second lever arm secured to the pintle and extending fore-and-aft and having the transverse axis as its fulcrum.

13. The invention defined in claim 11, including: a member journaled on the pintle and extending radially toward the panel and alongside the lever for rocking fore-and-aft relative to the lever and for rocking transversely with the lever in cross-over movement of said lever; front and rear stops fixed relative to the panel and support and engageable selectively by the member to limit fore-and-aft rocking of the member to an angular range less than that defined by the front and rear ends of the panel slot; and yielding detent means between the lever and member to connect the lever and member for rocking in unison within the limits afforded by the front and rear stops, said detent means yielding when the member engages either stop to enable the lever to overrun the stopped member.

14. Selector means, comprising: a panel having a plurality of fore-and-aft slots respectively having front and rear ends and a cross slot intersecting the fore-and-aft slots intermediate said ends; a support below the panel; a selector lever extending through the panel for movement fore-and-aft selectively in the fore-and-aft slots and for cross-over movement in the cross slot; joint means connecting the lever to the support on a transverse axis for the aforesaid fore-and-aft movement and on a fore-and-aft axis for said cross-over movement, said joint means including a shaft on said fore-and-aft axis, a pintle on said transverse axis, means mounting the pintle on the shaft to turn relative to the shaft on said transverse axis and to turn with the shaft on said fore-and-aft axis, and means rigidly connecting the lever to the pintle.

15. The invention defined in claim 14, including: a member journaled on the pintle and extending radially toward the panel and alongside the lever for rocking fore-and-aft relative to the lever and for rocking transversely with the lever in cross-over movement of said lever; front and rear stops fixed relative to the panel and support and engageable selectively by the member to limit fore-and-aft rocking of the member to an angular range less than that defined by the front and rear ends of the panel slot; and yielding detent means between the lever and member to connect the lever and member for rocking in unison within the limits afforded by the front and rear stops, said detent means yielding when the member engages either stop or enable the lever to overrun the stopped member.

References Cited in the file of this patent

UNITED STATES PATENTS 2,821,090    McCordic _____ Jan. 28, 1958

FOREIGN PATENTS 740,459    Great Britain _____ Nov. 16, 1955
946,867    France _____ June 16, 1949